US012368936B2

(12) United States Patent
Moore

(10) Patent No.: US 12,368,936 B2
(45) Date of Patent: Jul. 22, 2025

(54) INTERACTIVE MOBILE MULTIMEDIA PRESENTATION GENERATION

(71) Applicant: Giide Audio Inc., Boulder, CO (US)

(72) Inventor: David Scott Moore, Longmont, CO (US)

(73) Assignee: Giide Audio Inc., Boulder, CO (US)

( * ) Notice: Subject to any disclaimer, the term of this patent is extended or adjusted under 35 U.S.C. 154(b) by 159 days.

(21) Appl. No.: 18/238,329

(22) Filed: Aug. 25, 2023

(65) Prior Publication Data
US 2024/0073492 A1    Feb. 29, 2024

Related U.S. Application Data

(60) Provisional application No. 63/401,371, filed on Aug. 26, 2022.

(51) Int. Cl.
*H04N 21/8545* (2011.01)
*G06F 3/0482* (2013.01)
*G06F 3/0486* (2013.01)
*H04N 21/858* (2011.01)

(52) U.S. Cl.
CPC ....... *H04N 21/8545* (2013.01); *G06F 3/0482* (2013.01); *G06F 3/0486* (2013.01); *H04N 21/8586* (2013.01)

(58) Field of Classification Search
CPC .......... H04N 21/8545; H04N 21/8586; H04N 21/2743; G06F 3/0482; G06F 3/0486; G11B 27/031; G11B 27/11; G11B 27/34
See application file for complete search history.

(56) References Cited

U.S. PATENT DOCUMENTS

| | | | | |
|---|---|---|---|---|
| 10,887,671 | B2* | 1/2021 | Garmark | H04L 65/60 |
| 11,347,471 | B2* | 5/2022 | Prindle | G06F 16/9566 |
| 2008/0010601 | A1* | 1/2008 | Dachs | H04N 5/222 |
| | | | | 348/E5.022 |
| 2013/0318459 | A1* | 11/2013 | Taylor | G06F 3/04842 |
| | | | | 715/780 |
| 2016/0300280 | A1* | 10/2016 | Alsina | G06Q 30/0631 |
| 2023/0308630 | A1* | 9/2023 | Delgado | G06F 3/04842 |

* cited by examiner

*Primary Examiner* — Oschta I Montoya
(74) *Attorney, Agent, or Firm* — Michael Best & Friedrich LLP

(57) ABSTRACT

Examples provide a mobile computing device including a memory storing an interactive presentation application, a user interface, and an electronic processor. The electronic processor is configured to prompt a user to upload a first visual or audio media item, prompt the user to record a first audio recording contextually related to the first media item, link the first audio recording to the first media item, prompt the user to upload a second visual or audio media item, prompt the user to record a second audio recording contextually related to the second media item, link the second audio recording to the second media item, generate a second visual thumbnail representative of the second media item, and generate an interactive multimedia presentation that outputs the first media item and the linked first audio recording followed by the second media item and the linked second audio recording.

18 Claims, 17 Drawing Sheets

INTERACTIVE MOBILE MULTIMEDIA PRESENTATION GENERATION

FIELD

The present disclosure relates to systems and methods for creating media content.

SUMMARY

Conventional media formats such as videos, podcasts, and blogs make it difficult for users to interact with and engage with media. For example, while users may be able to repost or send (e.g., text, message, etc.) media items to friends, family, or other contacts, providing context or other engagement with the media is cumbersome, to the extent it is possible at all. Furthermore, the ability for a user to interact with the information or content being consumed may improve user retention of the information and overall user experience. For example, a user may retain information from a podcast more effectively where the user can interact with the podcast, such as by accessing information associated with the podcast. Additionally, when a user shares media (e.g., a news article) with another user, the user may wish to incorporate additional information related to, but not included in, the media to be shared (e.g., annotations or verbal description of sections of the news article).

Thus, there is a need for interactive, shareable, multimedia presentation generation. One example provides a mobile computing device including a memory storing an interactive presentation application; a user interface; an electronic processor configured to: generate a graphical user interface on the user interface; prompt a user, via the user interface, to upload a first media item, wherein the first media item includes at least one selected from a group consisting of: a first visual media item and a first audio media item; receiving an upload of the first media item; in response to receiving the first media item, prompt the user to record a first audio recording contextually related to the first media item; receive the first audio recording, via a microphone of the mobile computing device; link the first audio recording with the first media item; generate a first visual thumbnail representative of the first media item; prompt the user, via the user interface, to upload a second media item, wherein the second media item includes at least one selected from a group consisting of: a second visual media item and a second audio media item; receive the second media item; in response to receiving the second media item, prompt the user to record a second audio recording contextually related to the second media item; receive the second audio recording; link the second audio recording with the second media item; generate a second visual thumbnail representative of the second media item; generate an interactive multimedia presentation; and execute the interactive multimedia presentation by: displaying the first media item while simultaneously playing back the first audio recording, and after displaying the first media item while simultaneously playing back the first audio recording, displaying the second media item while simultaneously playing back the second audio recording.

In some aspects, each of the first media item and the second media item also include at least one selected from a group consisting of an image, a graphics interchange format (GIF), a text document, a survey, a webpage, a video, and a user profile.

In some aspects, the electronic processor is further configured to display the first visual thumbnail at a first position in the graphical user interface; display the second visual thumbnail at a second position in the graphical user interface; in response to the user selecting and moving the first visual thumbnail to the second position, change a display order of the first visual thumbnail and the second visual thumbnail by displaying the first visual thumbnail at the second position and displaying the second visual thumbnail at the first position or at a position between the first position and the second position; and modify the interactive multimedia presentation such that execution of the interactive multimedia presentation includes displaying the second media item while simultaneously playing back the second audio recording and, after displaying the second media item while simultaneously playing back the second audio recording, displaying the first media item while simultaneously playing back the first audio recording.

In some aspects, the electronic processor is further configured to upload the interactive multimedia presentation to a server; prompt the user, via the user interface, to share the interactive multimedia presentation; receive an input to share the interactive multimedia presentation; generate a sharable link to the interactive multimedia presentation in response to receiving the input; receive user input indicative of a target end-user device; and provide the sharable link to the target end-user device.

In some aspects, the electronic processor is configured to provide the sharable link to the target end-user device via at least one selected form the group consisting of a text message, an email, and a social media post.

In some aspects, the electronic processor is further configured to in response to the user uploading a first media item, prompt the user to input a caption corresponding to the first media item; receive a caption input by the user via the user interface; and modify the interactive multimedia presentation to simultaneously display the received caption and the first media item In some aspects, display a prompt on the user interface to prompt the user to add a title card representative of the interactive multimedia presentation, wherein the title card includes at least one selected from the group consisting of a cover photo, a title, and a description; receive a title card input by the user via the user interface; and modify the interactive multimedia presentation to display the title card prior to displaying the first media item.

In some aspects, the electronic processor is further configured to transcribe the first audio recording and the second audio recording; and save a transcription of the first audio recording and the second audio recording as metadata corresponding to the respective first media item or second media item.

In some aspects, the electronic processor is further configured to, in response to the user selecting an editor icon associated with the first visual thumbnail, prompt the user to delete the first media item, edit the transcription corresponding to the first audio recording, and/or change the first audio recording.

In some aspects, the electronic processor is further configured to receive, via the user interface, user input indicative of user interaction with the first media item, and display the second media item while simultaneously playing back the second audio recording in response to receiving the user input indicative of user interaction with the first media item.

Another example provides a method implemented in a mobile computing device. The method includes generating a graphical user interface on a user interface of the mobile computing device; generating a first prompt on the user interface, to prompt a user to upload a first media item, wherein the first media item comprises one or more of a first visual media item and an audio media item; in response to the user uploading the first media item, generating a first instruction on the user interface instructing the user to record a first audio recording contextually related to the first media item; linking the first audio recording to the first media item; generating a first visual thumbnail representative of the first media item; generating a second prompt on the user interface to prompt the user to upload a second media item, wherein the second media item comprises one or more of a second visual media item and a second audio media item; in response to the user uploading the second media item, generating a second instruction on the user interface to prompt the user to record a second audio recording contextually related to the second media item; linking the second audio recording to the second media item; generating a second visual thumbnail representative of the second media item; generating an interactive multimedia presentation including the first media item and the linked first audio recording followed by the second media item and the linked second audio recording; and executing the interactive multimedia presentation by: displaying the first media item while simultaneously playing back the first audio recording, and after displaying the first media item while simultaneously playing back the first audio recording, displaying the second media item while simultaneously playing back the second audio recording.

In some aspects, each of the first media item and the second media item include at least one selected from the group consisting of an image, a graphics interchange format (GIF) image, a text document, a survey, a webpage, a video, and a user profile.

In some aspects, the method further includes displaying the first visual thumbnail at a first position in the graphical user interface; displaying the second visual thumbnail at a second position in the graphical user interface; in response to the user selecting and moving the first visual thumbnail to the second position, changing a display order of the first visual thumbnail and the second visual thumbnail by displaying the first visual thumbnail at the second position in the graphical user interface and displaying the second visual thumbnail at the first position in the graphical user interface or at a position between the first position and the second position; and in response to changing the display order of the first visual thumbnail and the second visual thumbnail, modifying the interactive multimedia presentation such that execution of the interactive multimedia presentation includes displaying the second media item while simultaneously playing back the second audio recording and, after displaying the second media item while simultaneously playing back the second audio recording, displaying the first media item while simultaneously playing back the first audio recording.

In some aspects, the method further includes uploading the interactive multimedia presentation to a server; receiving an input, via the user interface, to share the interactive multimedia presentation; generating a link to the interactive multimedia presentation in response to receiving the input; receive user input indicative of a target end-user device and providing the link to the target end-user device.

In some aspects, the link is provided to the target end-user device via at least one selected from a group consisting of a text message, an email, and a social media post.

In some aspects, the method further includes in response to the user uploading a first media item, prompting the user to type a caption corresponding to the first media item; receiving a caption input by the user via the user interface; and modifying the interactive multimedia presentation to simultaneously display the received caption and the first media item.

In some aspects, the method further includes prompting the user to add a title card representative of the interactive multimedia presentation, wherein the title card includes at least one selected from a group consisting of a cover photo, a title, and a description; receiving a title card input by the user via the user interface; and modifying the interactive multimedia presentation to display the title card prior to displaying the first media item.

In some aspects, the method further includes transcribing the first audio recording into a first text file and the second audio recording into a second text file; and saving the first text file of the first audio recording as metadata corresponding to the first media item and the second text file of the second audio recording as metadata corresponding to the second media item.

In some aspects, the method further includes in response to the user selecting an editor icon associated with the first visual thumbnail on the user interface, presenting commands to the user on the user interface, wherein the commands include at least one selected from a group consisting of: deleting the first media item, editing the transcription corresponding to the first audio recording, and modifying the first audio recording.

In some aspects, the method further includes receiving, via the user interface, user input indicative of user interaction with the first media item, and displaying the second media item while simultaneously playing back the second audio recording in response to receiving the user input indicative of user interaction with the first media item.

DETAILED DESCRIPTION

Figure 1:
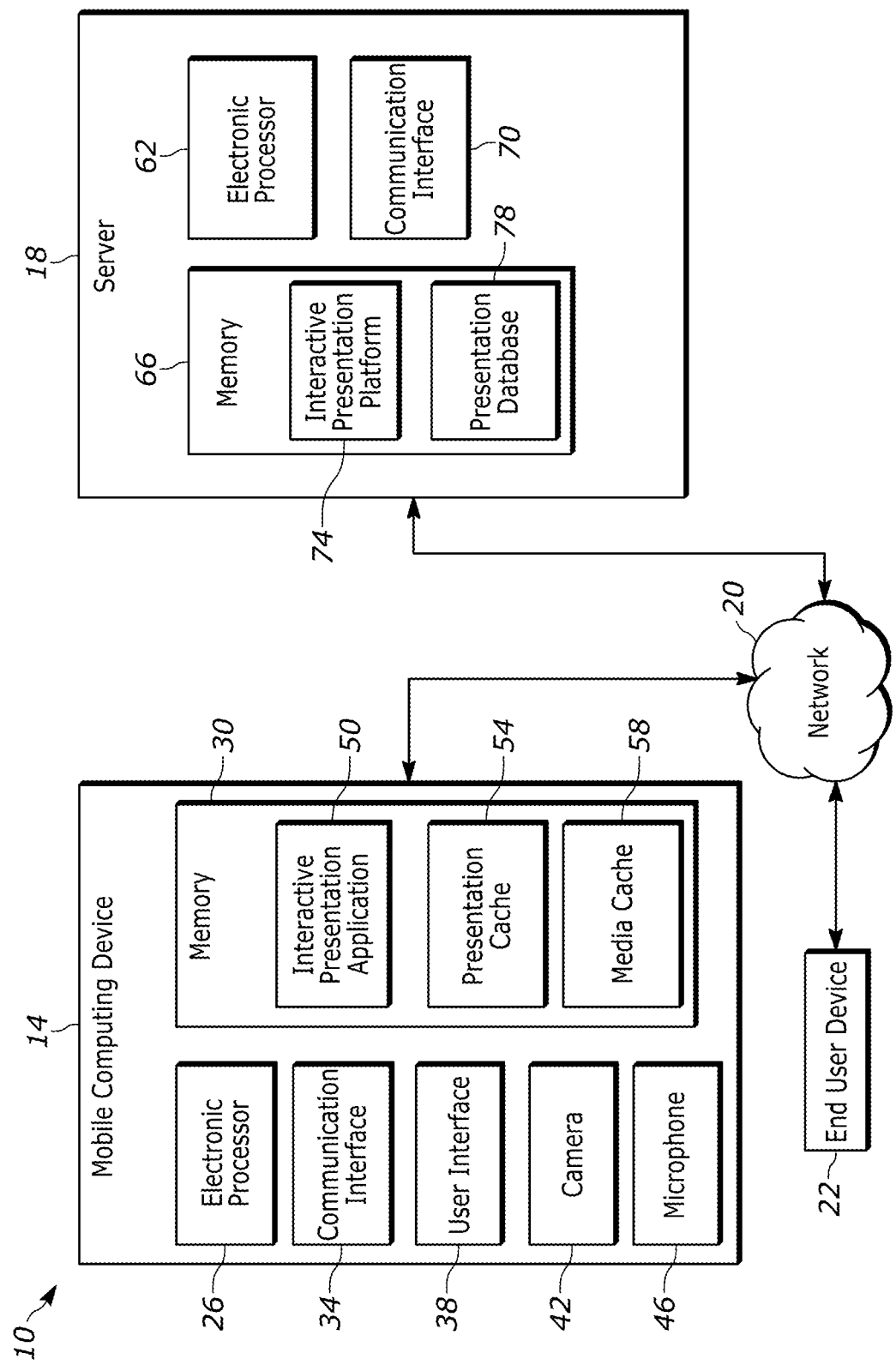
FIG. 1 illustrates a system for providing an interactive multimedia platform to a mobile device, according to some embodiments.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations. To reiterate, those electronic processors and processing may be distributed.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

FIG. 1 illustrates a system 10 for providing an interactive multimedia presentation platform to a mobile device, according to some embodiments. The system 10 at least includes a mobile computing device 14, a server 18, and a network 20. In some embodiments, the system 10 further includes an end-user device 22. The mobile computing device 14 may be any suitable mobile computing device. For example, the mobile computing device 14 may be a smart phone, a tablet, a laptop, or other suitable mobile computing device. The mobile computing device 14 may include an electronic processor 26, a memory 30, a communication interface 34, and a user interface 38. The electronic processor 26 may be implemented as a programmable microprocessor, an application specific integrated circuit ("ASIC"), one or more field programmable gate arrays ("FPGA"), a group of processing components, or using other suitable electronic processing components. The user interface 38 may be configured to allow for one or more inputs to be provided to the electronic processor 26. The user interface 38 may include a touchscreen interface, a display, a keyboard, a control panel having one or more displays and other user inputs (soft keys, hard keys, etc.), or any other device configured to allow for a user to receive and/or provide data to the electronic processor 26. The communication interface 34 is configured to allow the mobile computing device 14 to communicate with the server 18 or the end-user device 22 via the network 20. For example, the communication interface 34 may communicate using one or more wireless protocols, such as RF, Bluetooth, cellular (e.g., 3G, 4G, 5G, CDMA, etc.), RF, Wi-Fi, NFC, LoRA, and the like. The communication interface 34 may further allow for various wired communications, such as USB, USB-C, RS-232 (or other serial communication), Firewire, Ethernet, or other wired communication as required for a given application. In some embodiments, the communication interface 34 may be configured to allow the mobile computing device 14 to communicate directly with the end-user device 22. In some embodiments, the mobile computing device 14 further includes a camera 42 and a microphone 46. The memory 30 includes an interactive presentation application 50, an interactive multimedia presentation cache 54, and a media cache 58. The interactive multimedia presentation cache 54 may store interactive multimedia presentations created by a user of the mobile computing device 14 using the interactive presentation application 50. The media cache 58 may store media items (e.g., images, webpages, videos, graphics interchange formats ("GIFs"), etc.) that may be used for creating interactive multimedia presentations with the interactive presentation application 50.

Figure 2:
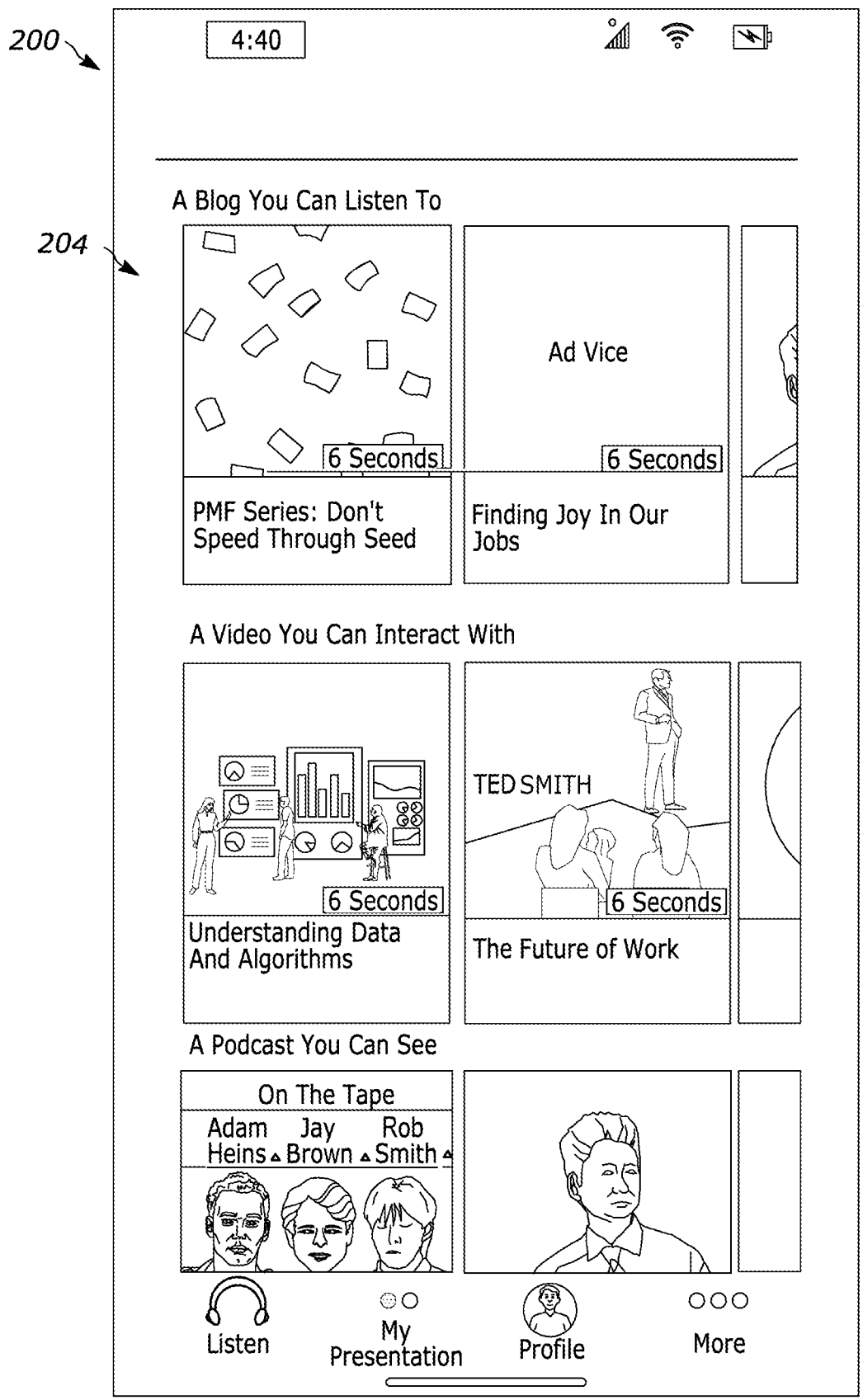
FIG. 2 illustrates a first example of a graphical user interface, according to some embodiments.

The electronic processor 26 is configured to generate a plurality of graphical user interfaces ("GUIs") corresponding to functions of the interactive presentation application 50, and displays the GUIs to a user via the user interface 38. The electronic processor 26 may generate a GUI corresponding to a home page or landing screen of the interactive presentation application 50, and provide the GUI to the user interface 38. The first GUI may be, for example, the GUI 200 illustrated in FIG. 2 displaying selectable interactive multimedia presentations 204 stored for example, in the presentation database 78.

Figure 3:
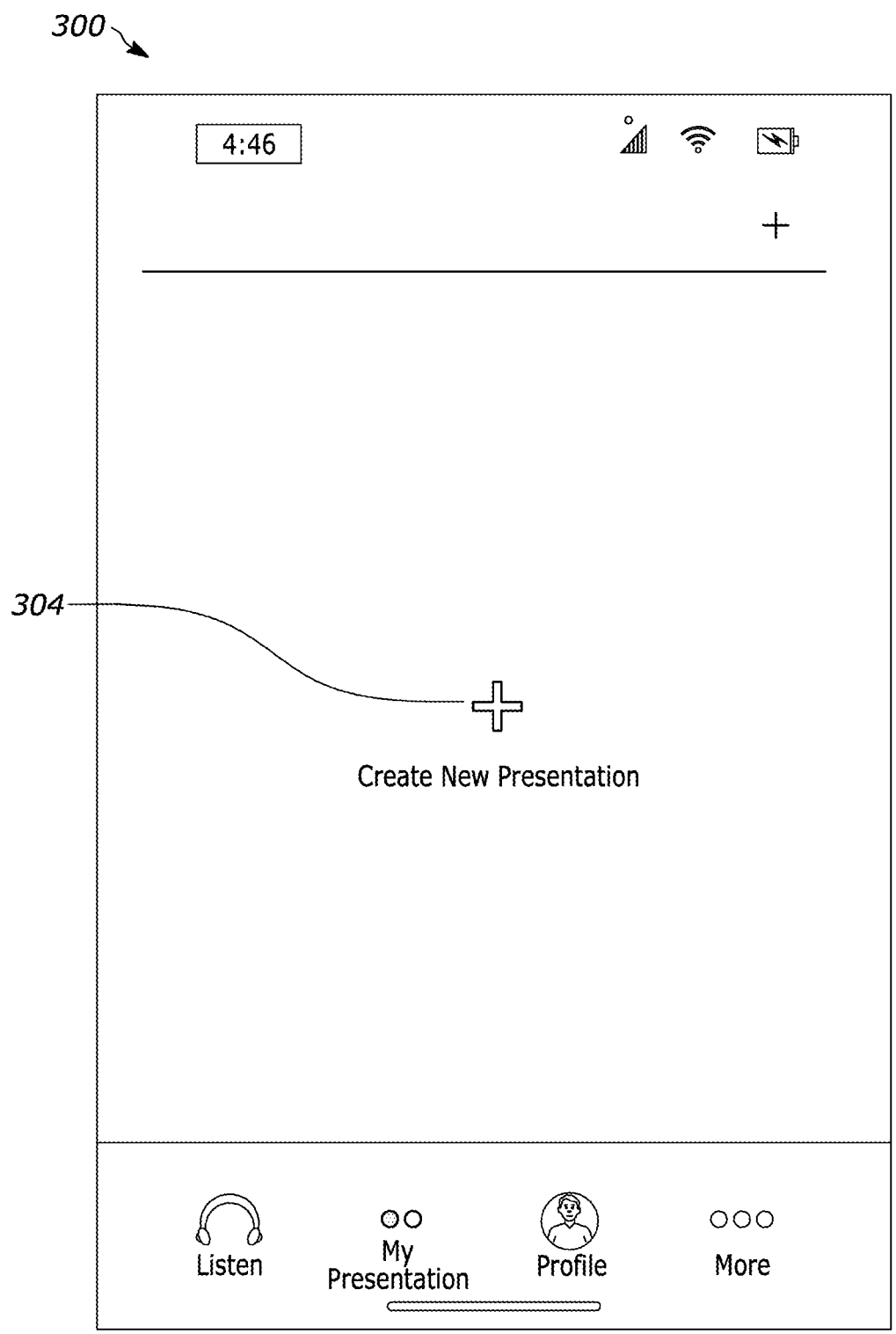
FIG. 3 illustrates a second example of a graphical user interface, according to some embodiments.
Figure 4:
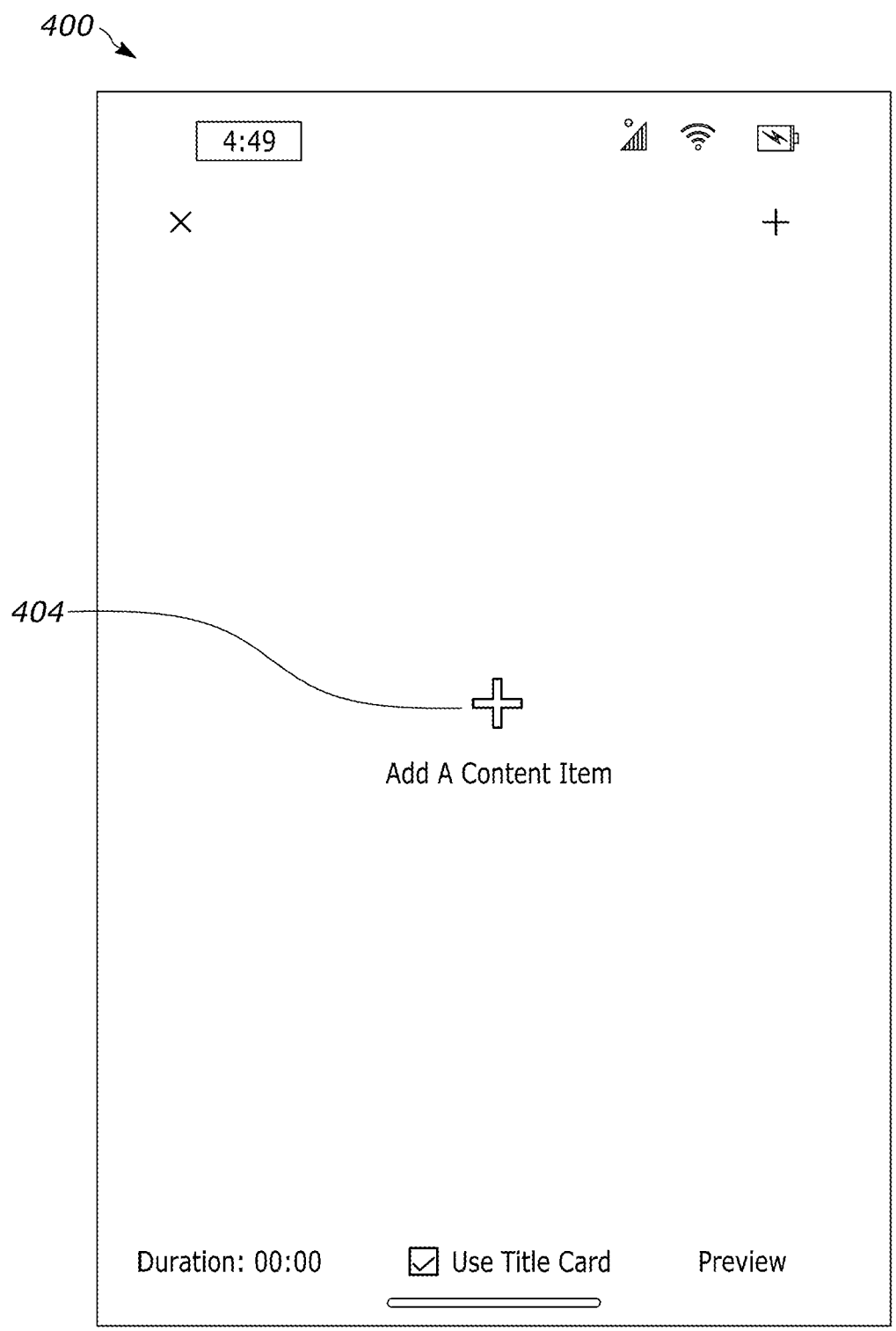
FIG. 4 illustrates a third example of a graphical user interface, according to some embodiments.

The electronic processor 26 may generate a second GUI, such as the GUI 300 illustrated in FIG. 3, for displaying interactive multimedia presentations created by the user of the mobile computing device 14 and stored in the interactive multimedia presentation cache 54 and/or the presentation database 78. When the user has not created any interactive multimedia presentations, the GUI 300 may display an icon 304 (e.g., a '+' icon), that when selected by the user, causes the electronic processor 26 to prompt the user to create a new interactive multimedia presentation. In response to the user tapping the '+' icon 304, the electronic processor 26 provides an editor platform to the user interface 38 for creating and editing interactive multimedia presentations. FIG. 4 illustrates an example GUI 400 corresponding to the editor platform and including a '+' icon 404 prompting the user to add a content item to the interactive multimedia presentation.

The server 18 may include an electronic processor 62, a server memory 66, and a communication interface 70. The communication interface 70 may be configured to allow the server 18 to communicate with the mobile computing device 14 or the end-user device 22 via the network 20. The server memory 66 includes an interactive multimedia presentation platform 74 and a presentation database 78.

Figure 5:
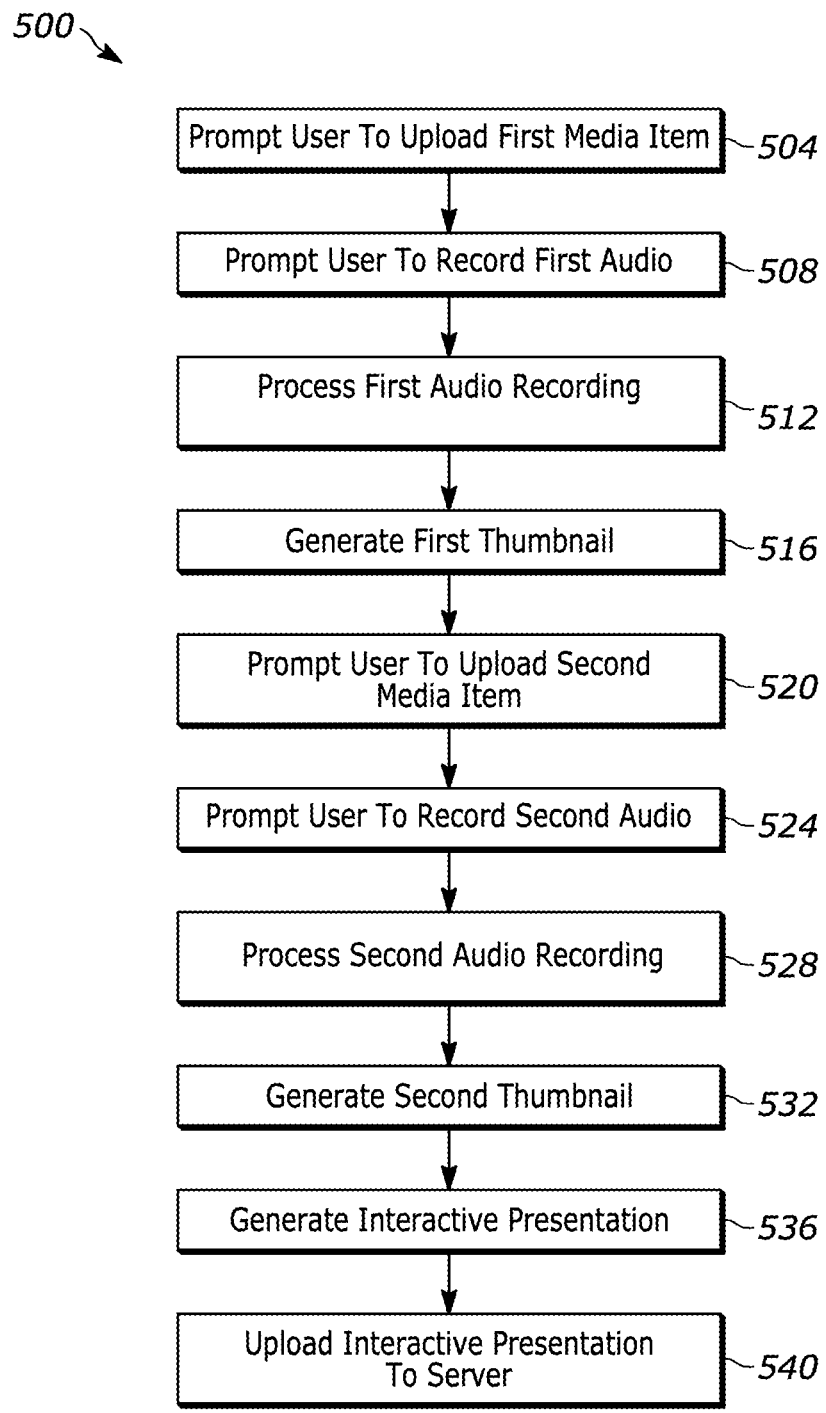
FIG. 5 illustrates a method for creating an interactive multimedia presentation, according to some embodiments.
Figure 6:
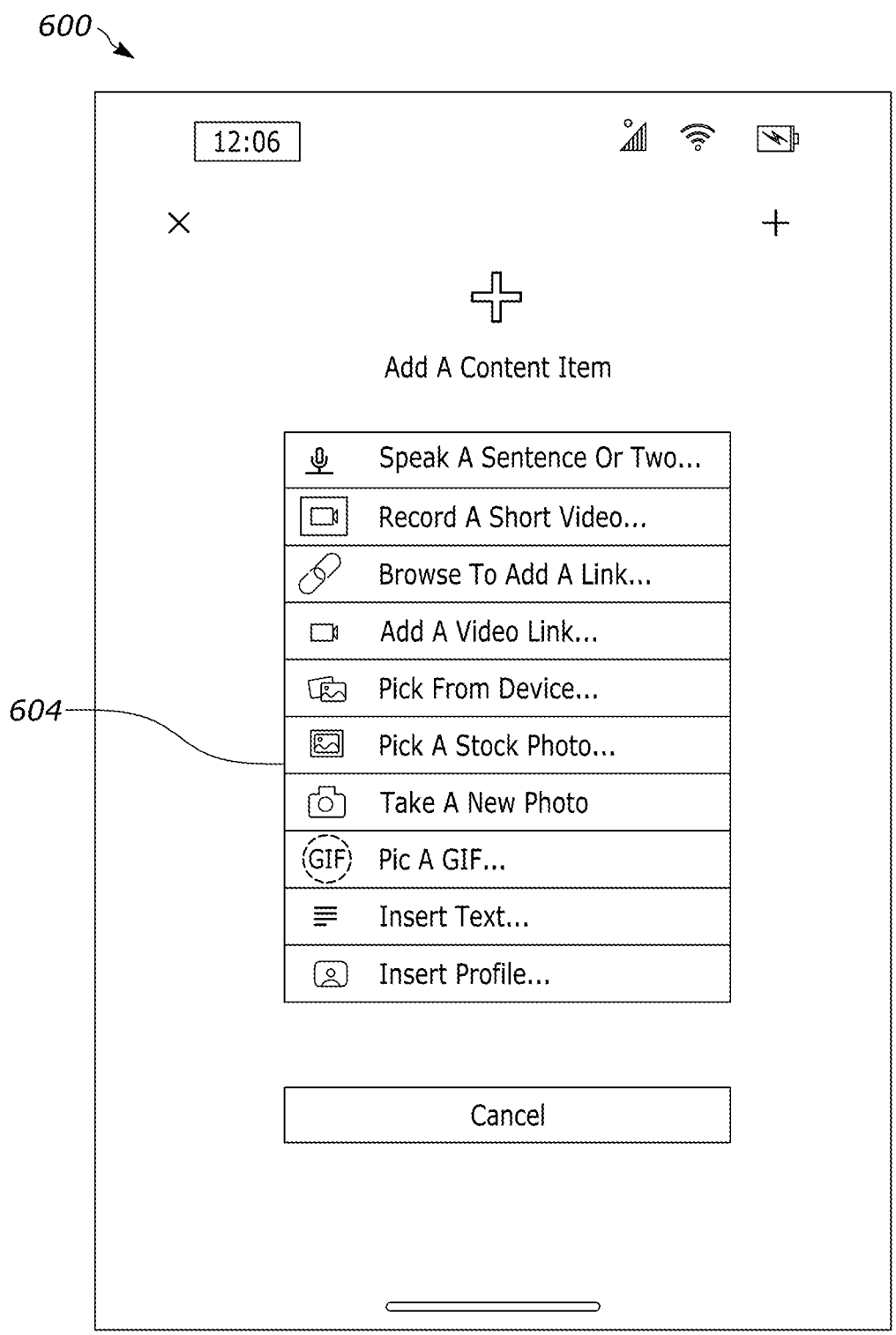
FIG. 6 illustrates a fourth example of a graphical user interface, according to some embodiments.

FIG. 5 illustrates a method 500 executed by the electronic processor 26 for creating an interactive multimedia presentation, according to some embodiments. In some instances, functions described herein are performed by the electronic processor 26 locally on the mobile computing device 14, such that interactive multimedia presentations may be created without access to internet and/or one or more remote servers. However, in some instances, one or more functions described herein (e.g., storage of interactive multimedia presentations, storage of media items, and/or the like) are performed in a cloud-based manner using one or more remote servers. At process block 504, the GUI 400 may display one or more icons (e.g., a "+"), that when selected, prompts the user to upload a new media item to the editor platform. The electronic processor 26 may then display, for example, a GUI 600 as illustrated in FIG. 6 including a prompt 604 to upload a new media item. The prompt 604 may include a plurality of media item options. For example, the user may be presented an option to insert a user profile (e.g., the profile of a user of the interactive multimedia platform), insert user-authored text, insert a graphics interchange format ("GIF") item, access the camera 42 to take a photo, select a stock photo, select a photo or video stored in the mobile computing device 14, insert a link to a video, browse the internet in order to link a webpage, record a video, and/or record an audio recording. Media items selected by the user may be stored in the media cache 58 on the mobile computing device 14.

Figure 7:
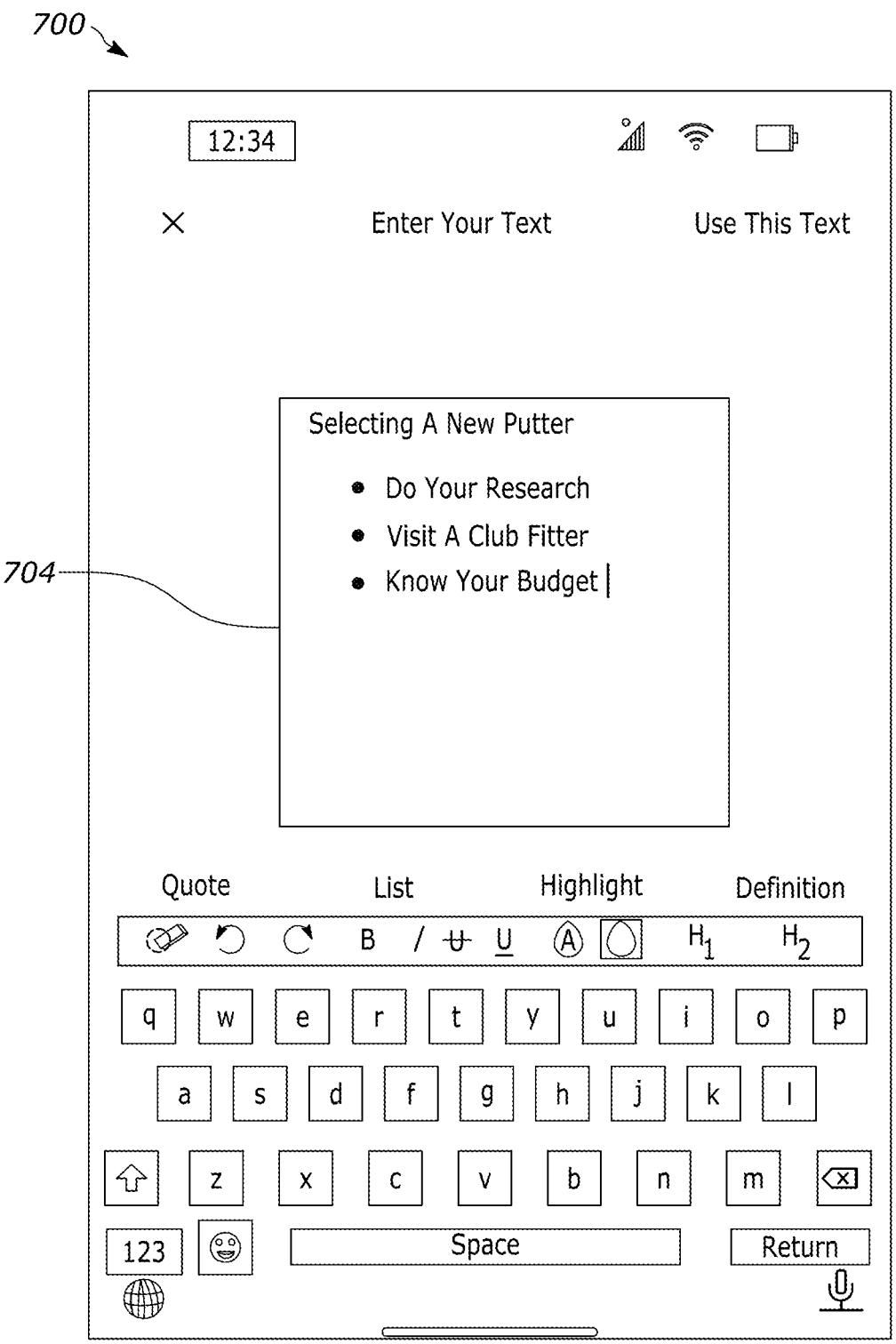
FIG. 7 illustrates a fifth example of a graphical user interface, according to some embodiments.

In response to a user selecting to insert text, the electronic processor 26 may provide a GUI including a text editor, for example, a GUI 700 illustrated in FIG. 7 including text editor 704. The text editor 704 receives text data as a user input (e.g., via a keyboard included in the user interface 38), and displays the text data to the GUI 700.

Figure 8:
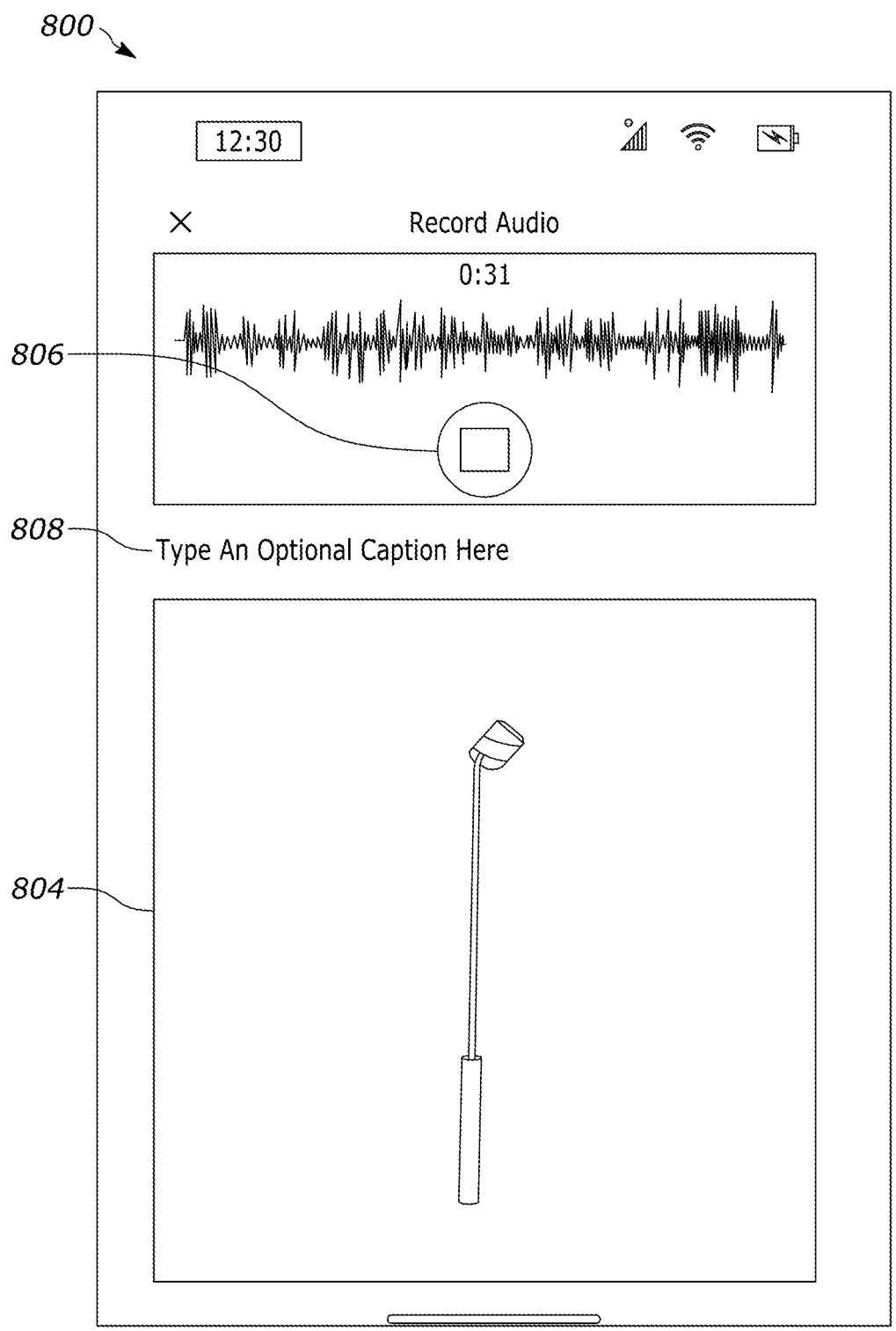
FIG. 8 illustrates a sixth example of a graphical user interface, according to some embodiments.

Referring again to FIG. 5, in response to a user selecting a first media item that does not contain audio (e.g., text, an image, a GIF, a webpage, a user profile, etc.), the method 500 proceeds to process block 512. At process block 508, the electronic processor 26 prompts the user to record audio contextually related to the first media item. For example, the electronic processor 26 may provide a GUI substantially similar to a GUI 800 illustrated in FIG. 8. The GUI 800 may include a depiction 804 of the first media item and an interactive start/stop element 806 for starting and stopping the recording of audio. The GUI 800 may also include a prompt 808 for the user to optionally provide text to generate a caption corresponding to the first media item.

In response to the user recording audio (e.g., a first audio recording related to the first media item), the electronic processor 26 processes the first audio recording (at process block 512). Processing the first audio recording includes, for example, saving the first audio recording locally on the mobile computing device 14 and/or remotely on the server 18, and linking the first audio recording to the first media item. The electronic processor 26 links the first audio recording to the first media item such that, while the interactive multimedia presentation is being viewed, the electronic processor 26 simultaneously plays the first audio recording (e.g., via a speaker included in the user interface 38) while displaying the first media item. When the first media item and the first audio recording are linked, a modification of the first media item may cause a similar change in the first audio recording. For example, in response to a user selecting to swap a display order of the first media item and another media item, the electronic processor 26 may similarly move the playback time of the first audio recording such that the first audio recording is played simultaneously with the first media item. In some instances, in response to receiving a user selection to remove the first media item from the interactive multimedia presentation, the electronic processor 26 may remove both the first media item and the linked first audio recording from the interactive multimedia presentation.

Processing the first audio recording (at process block 512) may further include automatically generating, with the electronic processor 26, a transcription of the first audio recording by converting the audio into text. For example, the electronic processor 26 may use one or more transcription algorithms to generate the transcription. In some instances, such as when a user selects to upload a video, the electronic processor 26 may automatically generate a transcription of the audio associated with the video. The electronic processor 26 may modify the pitch, speed, and/or other characteristics of the audio recording. In some instances, the electronic processor 26 may generate, as the first audio recording, synthetic audio narration based on text input by the user. In some instances, the electronic processor 26 uses an artificial intelligent module to automatically generate a transcript and/or an audio recording describing content included in the media item.

Figure 9:
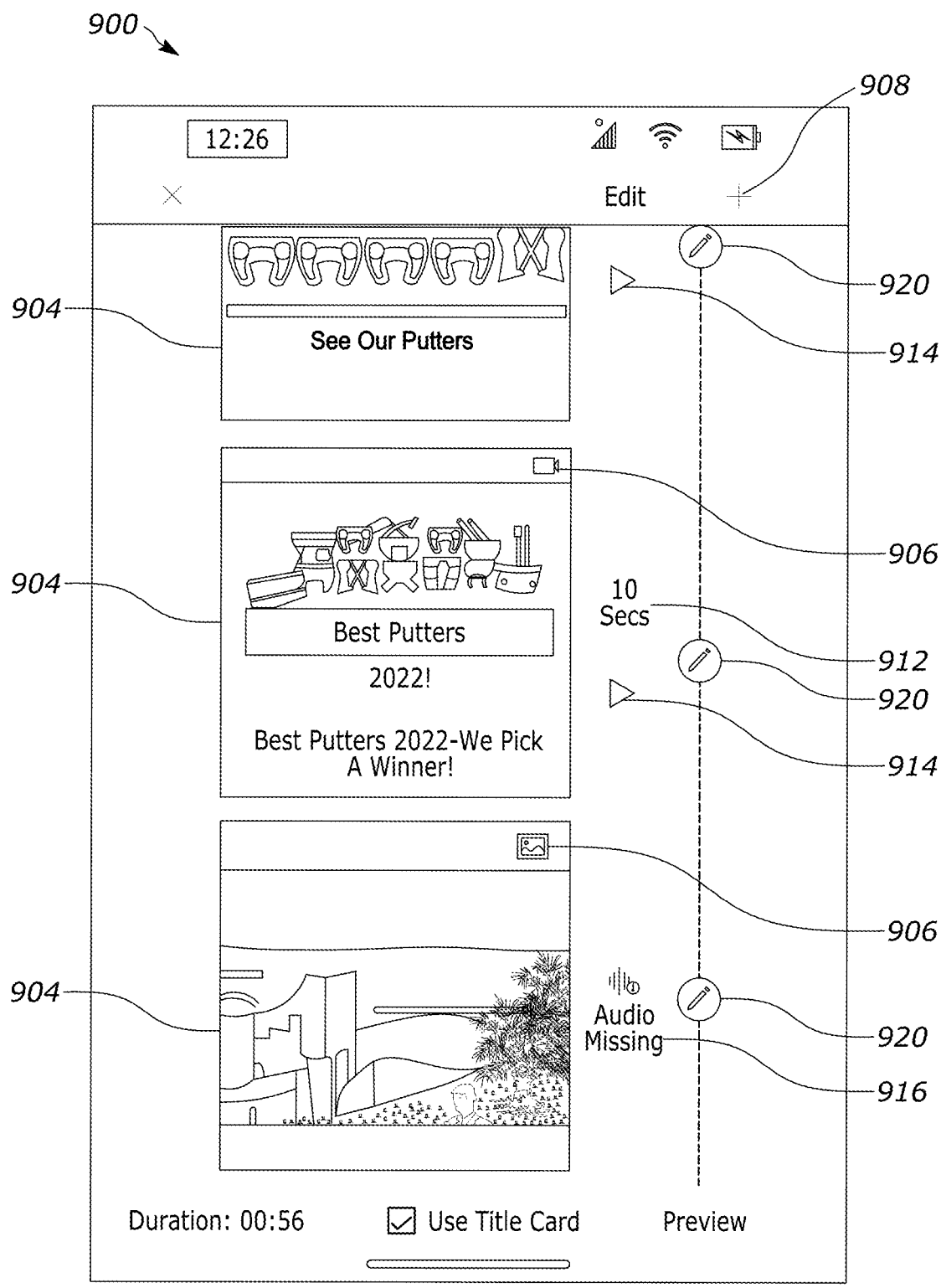
FIG. 9 illustrates a seventh example of a graphical user interface, according to some embodiments.

Referring again to FIG. 5, at process block 516, the electronic processor 26 generates a first thumbnail representative of the first media item and the first audio recording. For example, FIG. 9 illustrates a GUI 900 of the editor platform including a plurality of thumbnails 904 representative of media items uploaded by the user. In some instances, the electronic processor 26 generates each thumbnail 904 based on visual content included in the respective media item. For example, for a video media item, the electronic processor 26 may generate the corresponding thumbnail 904 based on a frame of the video. For a webpage media item, the electronic processor 26 may generate the corresponding thumbnail 904 based on, for example, a photo included in the webpage, a title of the webpage, and/or other visual content included in the webpage. In other examples, the electronic processor 26 may generate a corresponding thumbnail 904 based on a user selection of an image, such as a still image associated with an uploaded video, an image stored in the memory 30 of the mobile computing device 14, and/or an image downloaded via the network 20. Each thumbnail 904 may include a media type indicator 906 for indicating a format of the media item (e.g., a camera icon may indicate that a media item is video, a photograph icon may indicate that a media item is an image, a microphone icon may indicate that a media item is an audio recording, etc.)

The electronic processor 26 may also generate and display a length indicator 912 indicating a length of the audio recording associated with each media item. Each respective length indicator 912 may be displayed adjacent to or within the corresponding thumbnail 904. The electronic processor 26 may additionally generate and display, adjacent to or within each respective thumbnail 904, an icon 914 that, in response to user selection of the icon 914, causes the electronic processor 26 to start or stop a replay of the corresponding audio recording. In some embodiments, the user may defer recording an audio recording corresponding to a particular media item. In response to a user deferring to record an audio recording, the editor may display, next to or within the thumbnail 904 corresponding to the particular media item, an icon 916 indicating that audio is missing.

The electronic processor 26 may further provide an item editor icon 920 for editing at least one of a media item, a corresponding audio recording, or a thumbnail 904. In the illustrated example, the electronic processor 26 provides an item editor icon 920 adjacent to or within each respective thumbnail 904 for editing one or more items (e.g., the media item, the recording, and/or the thumbnail 904) associated with the respective thumbnail 904. As illustrated in FIG. 9, in some instances, the electronic processor 26 determines, based on a length of each audio recording, a total duration of the interactive multimedia presentation, and provides an indication of the total duration to the GUI 900.

The GUI 900 displays the plurality of thumbnails 904 corresponding to media items in a list manner corresponding to a presentation order of the media items. For example, during playback of the interactive multimedia presentation, the electronic processor 26 presents a media item corresponding to a thumbnail 904 displayed in an earlier position in the list display of the GUI 900 before a media item corresponding to a subsequent thumbnail 904 in the list. The interactive presentation application 50 enables the user creating the interactive multimedia presentation to re-arrange content of the interactive multimedia presentation by modifying the order in which thumbnails 904 are displayed in the GUI 900. The user may tap and drag a first thumbnail 904 to another location in the GUI 900 to move the corresponding media content to a different position in time in the interactive multimedia presentation. For example, dragging of a first thumbnail in the list to a position in the GUI 900 corresponding to a second thumbnail immediately subsequent to the first thumbnail in the list, or between the second thumbnail and a third thumbnail immediately subsequent to the second thumbnail in the list, causes the electronic processor 26 to swap the positions of the first and second thumbnails. Accordingly, when viewing or previewing the interactive multimedia presentation, the second media item and corresponding second audio recording will be presented to the end-user before the first media item and corresponding first audio recording.

In response to incorporating a first media item to the interactive multimedia presentation (e.g., by executing process blocks 504-516), the electronic processor 26 may proceed to process block 520, and prompt the user to upload a second media item to the editor. For example, in response to tapping a '+' icon (e.g., the '+' icon 404 illustrated in FIG. 4 and/or the '+' icon 908 illustrated in FIG. 9) included in a GUI (e.g., the GUI 400 of FIG. 4), the electronic processor 26 may provide the user with a GUI substantially similar to the GUI 600 described above with reference to FIG. 6. The electronic processor 26 may then execute process blocks 524-532 of the method 100. Process blocks 524-532 may be substantially similar as those described above with reference to process blocks 504-516 and performed with respect to a second media item. The steps of the method 500 may be repeated for each media item that is provided as part of the multimedia presentation. For example, the user may choose to only upload a single media item to the multimedia presentation. In other examples, the user may choose to upload more than two media items, for example, five media items. As noted above, media items may be videos, GIFs, images (e.g., JPEG, RAW, HTML, etc.), links, webpages, and/or other media items selected by a user for inclusion in the multimedia presentation.

Figure 10:
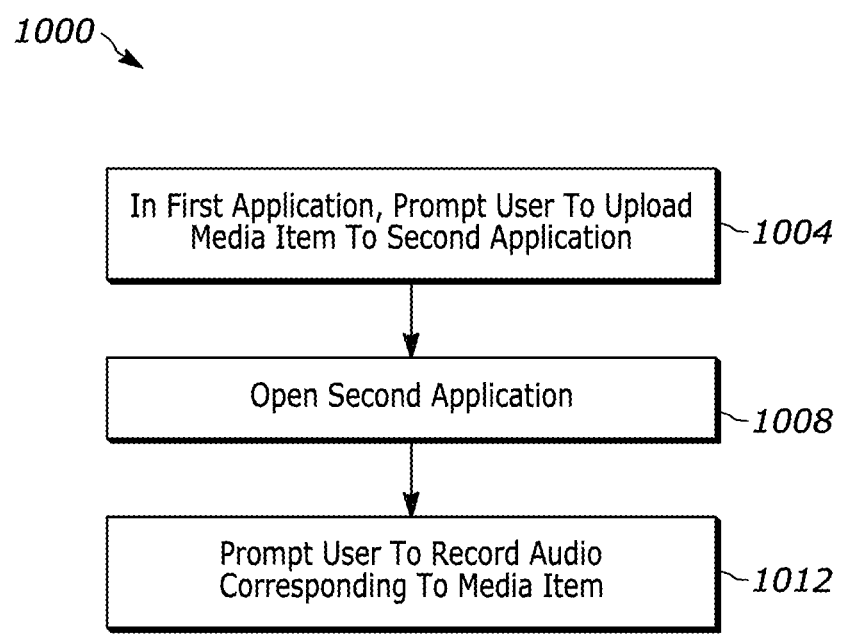
FIG. 10 illustrates another method for creating an interactive multimedia presentation, according to some embodiments.
Figure 11:
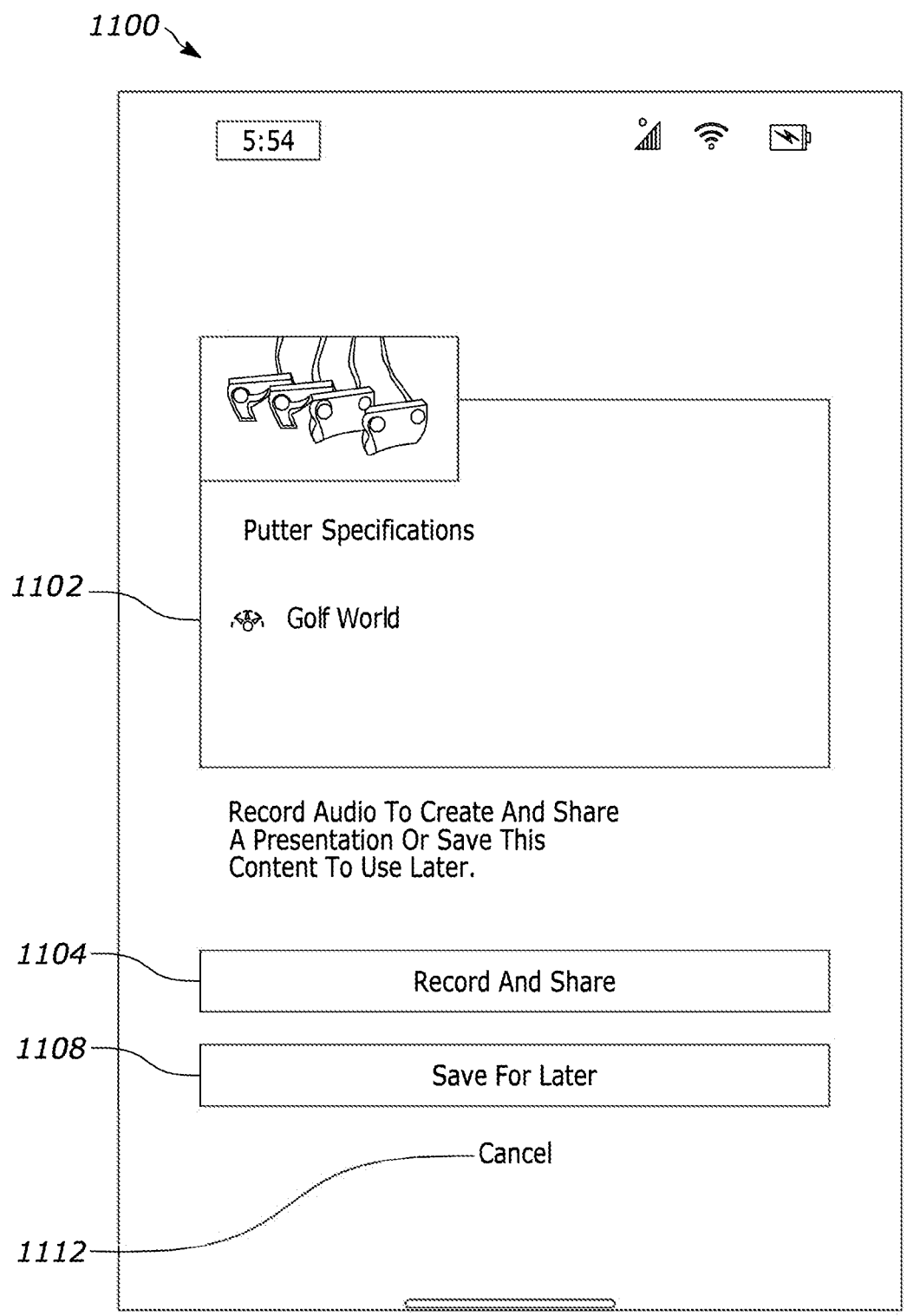
FIG. 11 illustrates an eighth example of a graphical user interface, according to some embodiments.

In some instances, the electronic processor 26 may provide the user with an option to share a media item directly to the interactive multimedia platform. Media items may include links, webpages, videos, images, etc. FIG. 10 illustrates a method 1000, executed by the electronic processor 26, for creating an interactive multimedia presentation in which a user may share a media item to the editor platform. FIG. 11 illustrates an example GUI 1100 that the electronic processor 26 may provide to the user via the user interface 38 in response to the user selecting to share a media items to the editor platform (at process block 1004). At process block 1004, the electronic processor 26 may execute the interactive multimedia presentation application on the mobile computing device 14. At process block 1008, the electronic processor 26 may display the shared media item, such as shared media item 1102, and provide a user-selectable option to record audio related to the shared media item 1102 (e.g., using button 1104), and/or to save the shared media content to the media cache 58 for later creation of an interactive multimedia presentation (e.g., using button 1108). For example, the user may be able to access the shared media content stored within the media cache 58 and add associated audio at a later time. The electronic processor 26 may additionally provide a user-selectable option (e.g., using button 1112) to cancel sharing the media item. In response to a user selecting to cancel sharing of the media item, the electronic processor 26 may discard the shared media item rather than storing the media item in the media cache 58.

Figure 12:
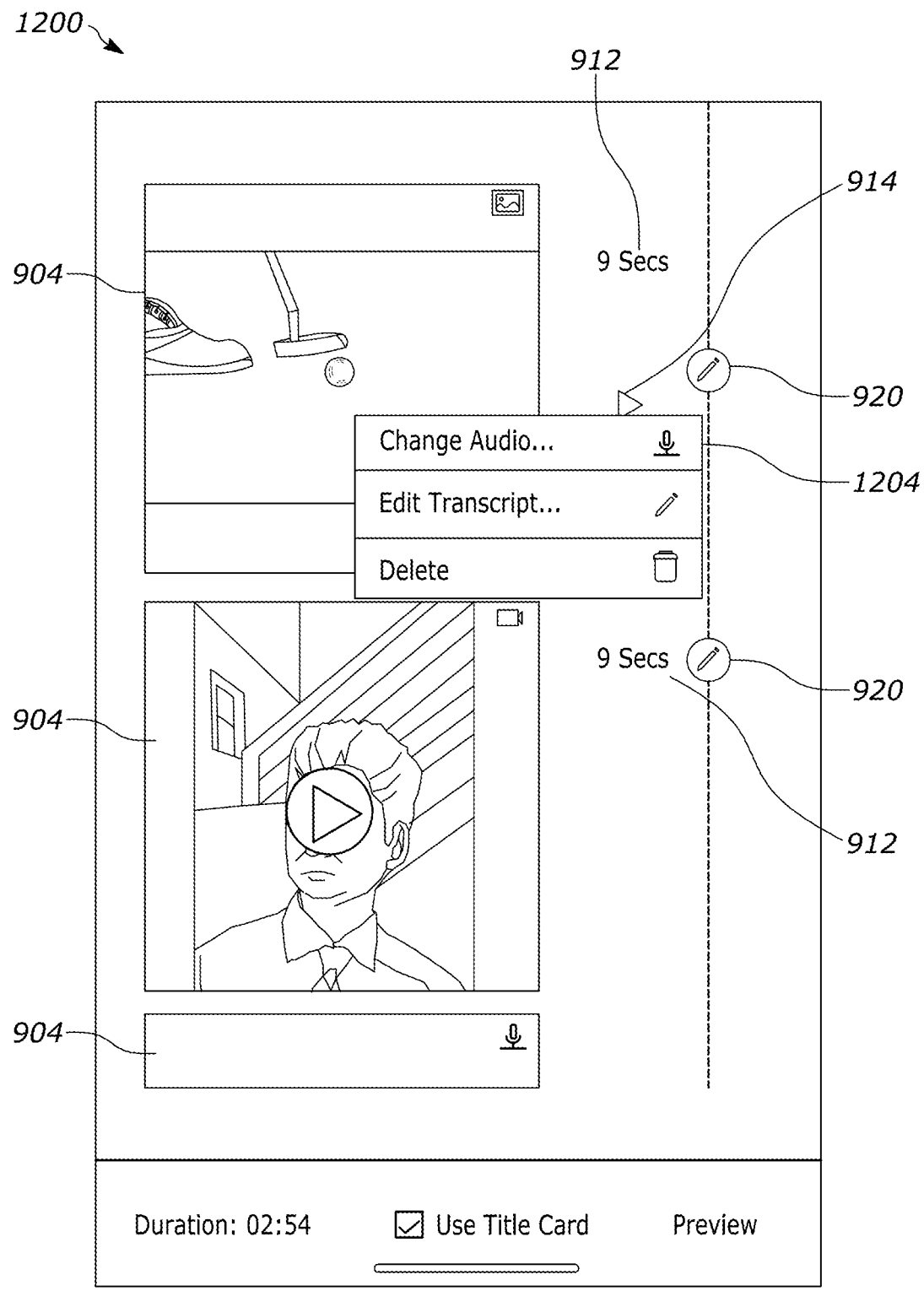
FIG. 12 illustrates a ninth example of a graphical user interface, according to some embodiments.

Referring now to FIG. 12, which illustrates a GUI 1200 including a plurality of thumbnails 904 corresponding to media items uploaded by the electronic processor 26 to the editor platform, the electronic processor 26 may receive a selection by the user to edit content related to one or more media items. Some aspects of the GUI 1200 may be substantially similar to the GUI 900 described above with respect to FIG. 9. For example, each thumbnail 904 may include an item editor icon 920. In response to receiving a user input of tapping (or otherwise interfacing with) the item editor icon 920, the electronic processor 26 may display to the GUI 1200 a menu 1204 including a set of selectable options for editing the media item to which the selected item editor icon 920 corresponds. For example, the electronic processor 26 may provide a user-selectable option to change the corresponding audio recording (e.g., re-record the audio recording linked to the media item), edit the transcript of the corresponding audio recording, and/or delete the media item.

Figure 13:
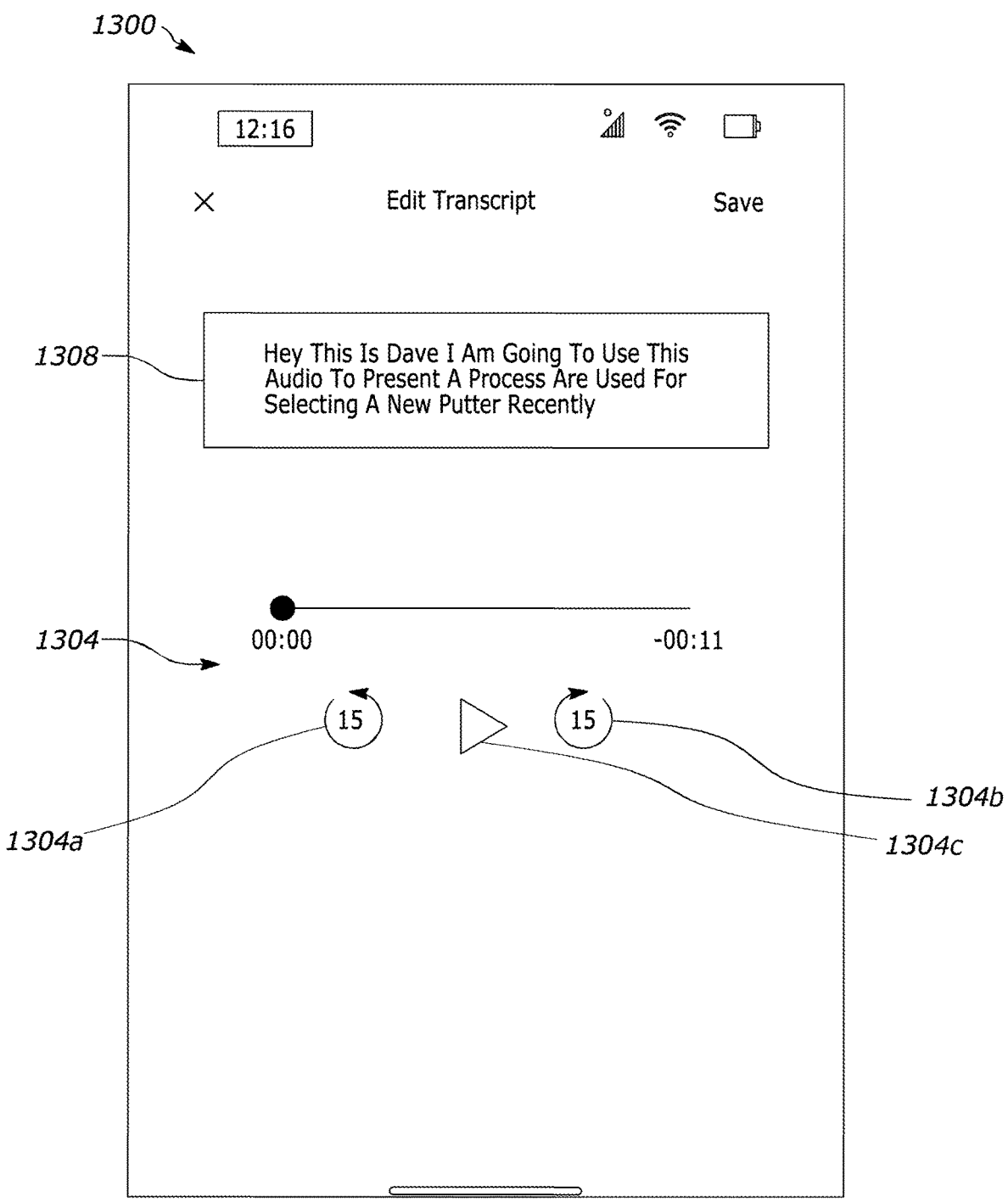
FIG. 13 illustrates a tenth example of a graphical user interface, according to some embodiments.

Referring now to FIG. 13 an example GUI 1300 corresponding to a transcription editor screen for modifying a transcript is illustrated. The GUI 1300 may include audio playback options 1304 (e.g., including a skip forward option 1304a, a skip backward option 1304b, a start/stop option, an audio timeline slider 1304c, etc.) and a user-editable transcript display 1308. The electronic processor 26 may provide the transcript display 1308 with some or all of the transcript associated with the audio recording. In some instances, the electronic processor 26 displays, using the transcript display 1308, only a segment of the full transcript (e.g., a five second segment, a ten second segment, a fifteen second segment etc.). The segment of the transcript displayed may correspond to a segment of the audio of the same length that is played in response to user selection of one or more audio playback options 1304. Based on user modification of the text of the transcript segment, the electronic processor 26 updates the stored transcript associated with the media item.

Figure 14:
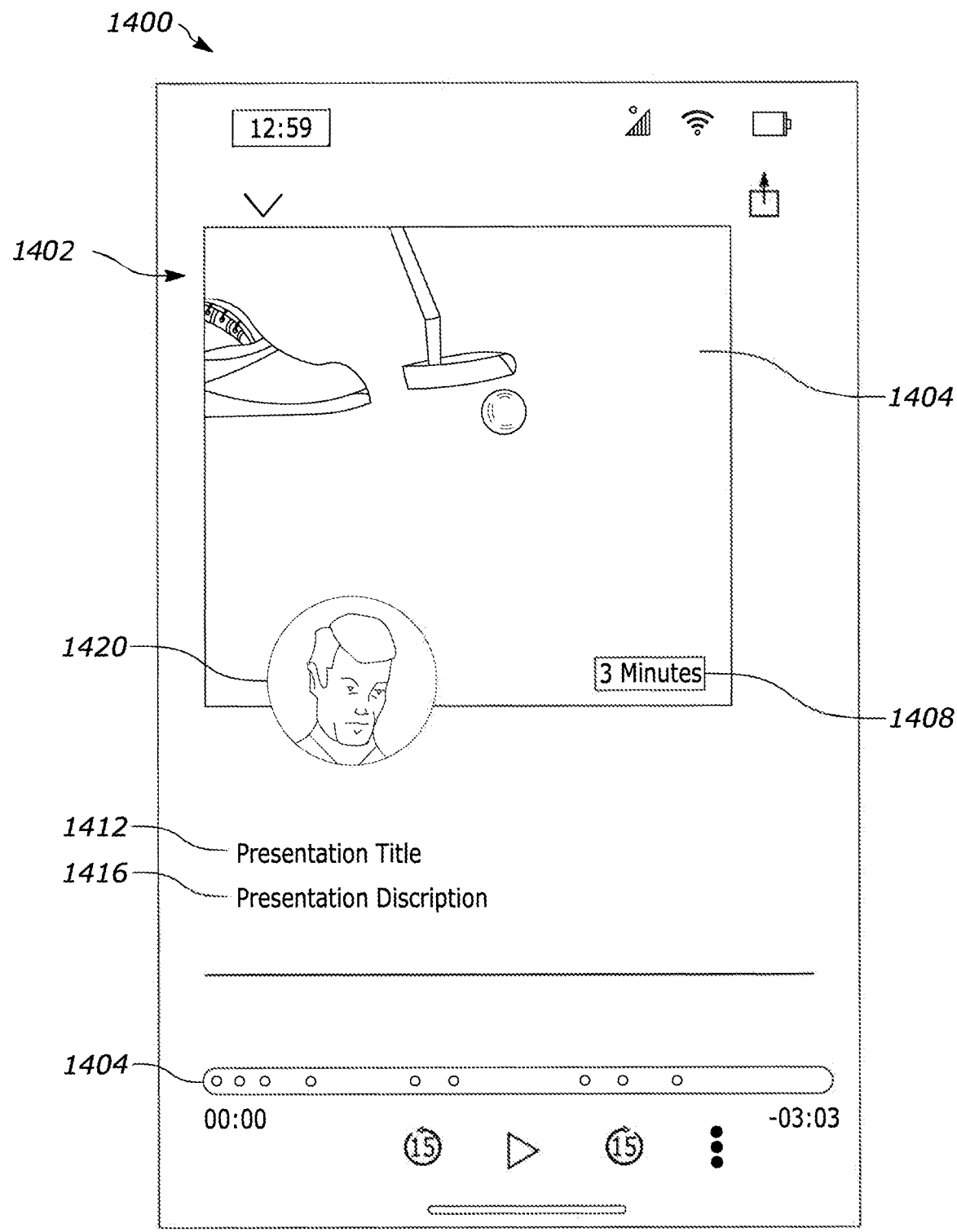
FIG. 14 illustrates an eleventh example of a graphical user interface, according to some embodiments.

In some instances, the interactive multimedia presentation editor platform may further include an option to add a title card to the interactive multimedia presentation. For example, FIG. 14 illustrates an example GUI 1400 including a title card 1402 that may be presented to an end-user prior to viewing the interactive multimedia presentation. When an interactive multimedia presentation includes a title card 1402, in response to receiving a user selection to view the interactive multimedia presentation, the electronic processor 26 displays the title card 1402 before initiating playback of the presentation.

The title card 1402 may include relevant information related to the contents or the creator of the interactive multimedia presentation. For example, the title card GUI 1400 may include a cover photo 1404 associated with the interactive multimedia presentation, a length indicator 1408 (e.g., indicating a total length or an approximate length of the presentation), a presentation title 1412, presentation description 1416, and/or a profile photo 1420 of the user associated with the presentation.

Figure 15:
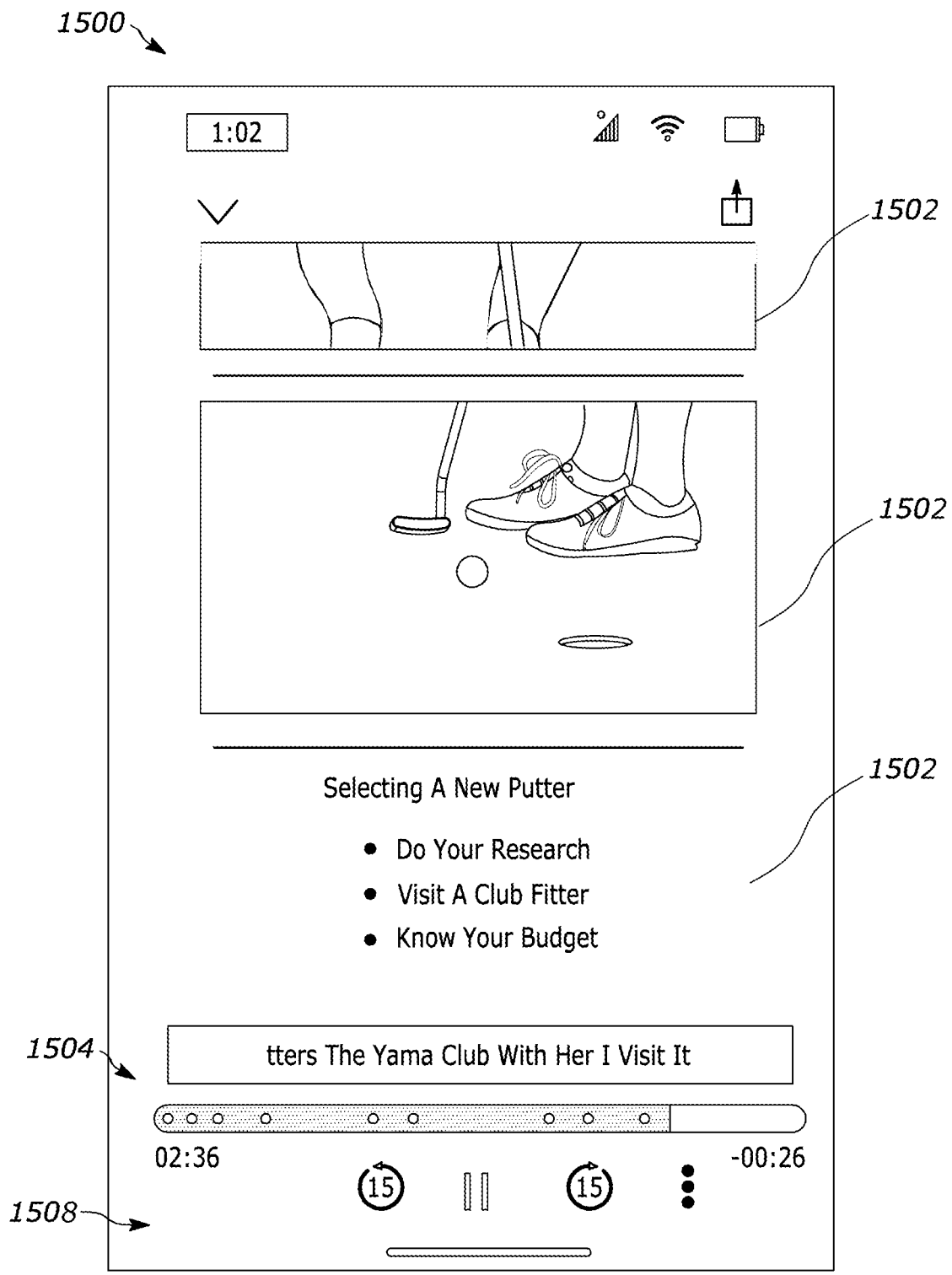
FIG. 15 illustrates a twelfth example of a graphical user interface, according to some embodiments.

Referring now to FIG. 15, in some instances, the electronic processor 26 generates preview of the interactive multimedia presentation before the presentation is finalized. FIG. 15 illustrates an example GUI 1500 of a preview of the interactive multimedia presentation. The preview may be substantially similar to a published interactive multimedia presentation. For example, the preview or the published interactive multimedia presentation may include a visual timeline 1504 including indicators for locations of each media item 1502, as well as the current runtime of the interactive multimedia presentation. The interactive multimedia presentation may display some or all of the media item(s) 1502 included in the interactive multimedia presentation and the transcription of the corresponding audio recording(s). The interactive multimedia presentation may also include user-selectable icons 1508 for pausing, skipping back, or skipping forward within the interactive multimedia presentation. In some embodiments, the user may also scroll up or down via the user interface 38 to view previous or future media items 1502 included in the interactive multimedia presentation. For example, the visual content of the interactive multimedia presentation may be presented to the user similar to a social media feed.

In some embodiments, when generating the preview or published interactive multimedia presentation to the user, the electronic processor 26 may first display the title card 1402 using the user interface 38. In response to the user interacting with (e.g., tapping or swiping) the title card, the electronic processor 26 may display the first media item 1502 on the user interface 38 while simultaneously playing back an audio recording linked to the first media item 1502 in instances where audio has been recorded for the first media item 1502. In response to the user interacting (e.g., tapping, swiping, scrolling, or the like) with the first media item 1502, the electronic processor 26 may then display a subsequent second media item 1502 while simultaneously playing back an audio recording linked to the second media item 1502 in instances where audio has been recorded for the second media item 1502.

In some embodiments, the electronic processor 26 first displays the thumbnail associated with a media item 1502 before displaying the respective media item, and only displays the respective media item 1502 after the user interacts with the thumbnail (e.g., by tapping, swiping, scrolling, or the like). In some embodiments, for example when the interactive multimedia presentation includes a single media item 1502, a thumbnail corresponding to the single media item 1502 is not provided to the user interface 38 prior to the electronic processor 26 providing the single media item 1502 and associated audio.

Returning again to FIG. 5, upon a user being satisfied with the content of the interactive multimedia presentation being created, the electronic processor 26 may proceed to process block 536 of the method 500. At process block 536, the electronic processor 26 may receive a user selection, via the user interface 38, to publish the interactive multimedia presentation. At process block 540, in response to receiving the user selection to publish the interactive multimedia presentation, the electronic processor 26 transmits the electronic multimedia presentation to the server 18 via the network 20.

Figure 16:
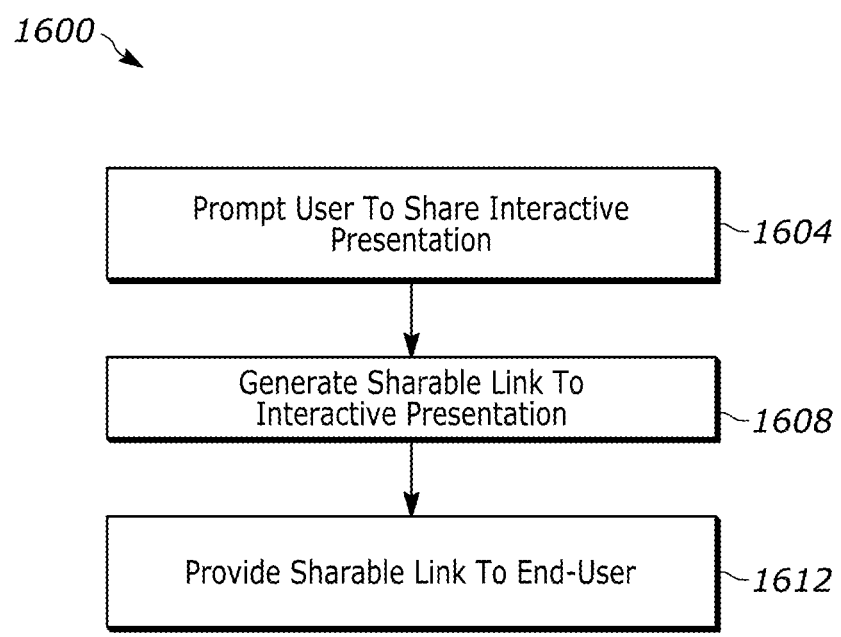
FIG. 16 illustrates a method for sharing an interactive multimedia presentation, according to some embodiments.

FIG. 16 illustrates a process 1600 executed by the electronic processor 26 for sharing a published interactive multimedia presentation. Once an interactive multimedia presentation has been published, the electronic processor 26 may prompt the user to share the multimedia presentation (process block 1604). For example, when the user is viewing the list of interactive multimedia presentations they have created, they may select a menu icon corresponding to a particular interactive multimedia presentation and select an option to share the multimedia presentation. The electronic processor 26 may share the multimedia presentation by generating a link (e.g., an internet link, or an application-specific link associated with the interactive presentation application 50) to the presentation that is accessible by other mobile computing devices 14 having the interactive presentation application 50 installed thereon, or accessible by other mobile computing devices 14 by means of an internet browser for displaying the interactive multimedia presentation.

Figure 17:
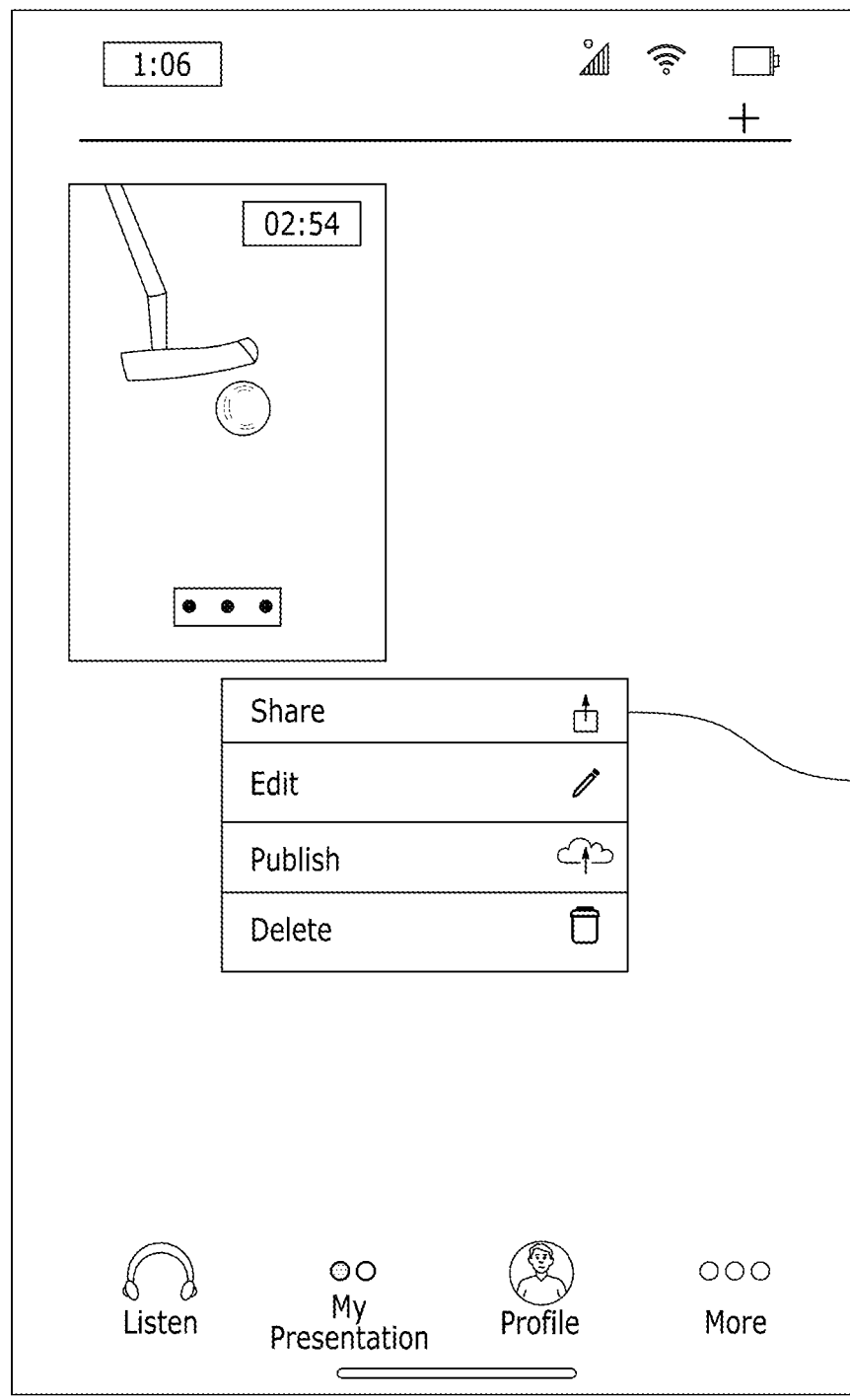
FIG. 17 illustrates a thirteenth example of a graphical user interface, according to some embodiments.

FIG. 17 illustrates an example GUI 1700 including a menu 1704 for sharing, editing, publishing, or deleting an interactive multimedia presentation. In response to receiving a user-selection to share the interactive multimedia presentation, the electronic processor 26 may generate a sharable link to the interactive multimedia presentation, and provide the sharable link to an end-user (process block 1608). The user may select to share the multimedia presentation via any suitable manner. For example, the electronic processor 26 may generate a text message, an email, or a social media post in order to direct an end-user to the published interactive multimedia presentation (process block 1612).

In some embodiments, the user may share the interactive multimedia presentation without publishing the interactive multimedia presentation. In some embodiments, the electronic processor 26 may store location information (e.g., positional coordinates) associated with the interactive multimedia presentation. For example, when the electronic processor 26 determines that the mobile computing device 14 is within range of a position associated with the interactive multimedia presentation, the electronic processor 26 may provide a notification to the user interface 38 and prompt the user to view the interactive multimedia presentation.

Thus, embodiments herein provide a mobile interactive multimedia platform.

What is claimed is:

1. A mobile computing device comprising:
a memory storing an interactive presentation application;
a user interface;
an electronic processor configured to:
generate a graphical user interface on the user interface;
prompt a user, via the user interface, to upload a first media item, wherein the first media item includes at least one selected from a group consisting of: a first visual media item and a first audio media item;
receiving an upload of the first media item;
in response to receiving the first media item, prompt the user to record a first audio recording contextually related to the first media item;
receive the first audio recording, via a microphone of the mobile computing device;
link the first audio recording with the first media item;
generate a first visual thumbnail representative of the first media item;
prompt the user, via the user interface, to upload a second media item, wherein the second media item includes at least one selected from a group consisting of: a second visual media item and a second audio media item;
receive the second media item;
in response to receiving the second media item, prompt the user to record a second audio recording contextually related to the second media item;
receive the second audio recording;
link the second audio recording with the second media item;
generate a second visual thumbnail representative of the second media item;
generate an interactive multimedia presentation; and
execute the interactive multimedia presentation by:
displaying the first media item while simultaneously playing back the first audio recording, and
after displaying the first media item while simultaneously playing back the first audio recording, displaying the second media item while simultaneously playing back the second audio recording;
wherein the electronic processor is further configured to:
display the first visual thumbnail at a first position in the graphical user interface;
display the second visual thumbnail at a second position in the graphical user interface;
in response to the user selecting and moving the first visual thumbnail to the second position, change a display order of the first visual thumbnail and the second visual thumbnail by displaying the first visual thumbnail at the second position and displaying the second visual thumbnail at the first position or at a position between the first position and the second position; and
modify the interactive multimedia presentation such that execution of the interactive multimedia presentation includes displaying the second media item while simultaneously playing back the second audio recording and, after displaying the second media item while simultaneously playing back the second audio recording, displaying the first media item while simultaneously playing back the first audio recording.

2. The mobile computing device of claim 1, wherein each of the first media item and the second media item also include at least one selected from a group consisting of an image, a graphics interchange format (GIF), a text document, a survey, a webpage, a video, and a user profile.

3. The mobile computing device of claim 1, wherein the electronic processor is further configured to:
upload the interactive multimedia presentation to a server;
prompt the user, via the user interface, to share the interactive multimedia presentation;
receive an input to share the interactive multimedia presentation;
generate a sharable link to the interactive multimedia presentation in response to receiving the input;
receive user input indicative of a target end-user device; and
provide the sharable link to the target end-user device.

4. The mobile computing device of claim 3, wherein the electronic processor is configured to provide the sharable link to the target end-user device via at least one selected form the group consisting of a text message, an email, and a social media post.

5. The mobile computing device of claim 1, wherein the electronic processor is further configured to:
in response to the user uploading a first media item, prompt the user to input a caption corresponding to the first media item;
receive a caption input by the user via the user interface; and
modify the interactive multimedia presentation to simultaneously display the received caption and the first media item.

6. The mobile computing device of claim 1, wherein the electronic processor is further configured to:
display a prompt on the user interface to prompt the user to add a title card representative of the interactive multimedia presentation, wherein the title card includes at least one selected from the group consisting of a cover photo, a title, and a description;

receive a title card input by the user via the user interface; and modify the interactive multimedia presentation to display the title card prior to displaying the first media item.

7. The mobile computing device of claim 1, wherein the electronic processor is further configured to:
transcribe the first audio recording and the second audio recording; and
save a transcription of the first audio recording and the second audio recording as metadata corresponding to the respective first media item or second media item.

8. The mobile computing device of claim 1, wherein the electronic processor is further configured to:
in response to the user selecting an editor icon associated with the first visual thumbnail, prompt the user to delete the first media item, edit the transcription corresponding to the first audio recording, and/or change the first audio recording.

9. The mobile computing device of claim 1, wherein the electronic processor is further configured to:
receive, via the user interface, user input indicative of user interaction with the first media item, and
display the second media item while simultaneously playing back the second audio recording in response to receiving the user input indicative of user interaction with the first media item.

10. A method implemented in a mobile computing device, the method comprising:
generating a graphical user interface on a user interface of the mobile computing device;
generating a first prompt on the user interface, to prompt a user to upload a first media item, wherein the first media item comprises one or more of a first visual media item and an audio media item;
in response to the user uploading the first media item, generating a first instruction on the user interface instructing the user to record a first audio recording contextually related to the first media item;
linking the first audio recording to the first media item;
generating a first visual thumbnail representative of the first media item;
generating a second prompt on the user interface to prompt the user to upload a second media item, wherein the second media item comprises one or more of a second visual media item and a second audio media item;
in response to the user uploading the second media item, generating a second instruction on the user interface to prompt the user to record a second audio recording contextually related to the second media item;
linking the second audio recording to the second media item;
generating a second visual thumbnail representative of the second media item;
generating an interactive multimedia presentation including the first media item and the linked first audio recording followed by the second media item and the linked second audio recording; and
executing the interactive multimedia presentation by:
displaying the first media item while simultaneously playing back the first audio recording, and
after displaying the first media item while simultaneously playing back the first audio recording, displaying the second media item while simultaneously playing back the second audio recording;
displaying the first visual thumbnail at a first position in the graphical user interface;
displaying the second visual thumbnail at a second position in the graphical user interface;
in response to the user selecting and moving the first visual thumbnail to the second position, changing a display order of the first visual thumbnail and the second visual thumbnail by displaying the first visual thumbnail at the second position in the graphical user interface and displaying the second visual thumbnail at the first position in the graphical user interface or at a position between the first position and the second position; and
in response to changing the display order of the first visual thumbnail and the second visual thumbnail, modifying the interactive multimedia presentation such that execution of the interactive multimedia presentation includes displaying the second media item while simultaneously playing back the second audio recording and, after displaying the second media item while simultaneously playing back the second audio recording, displaying the first media item while simultaneously playing back the first audio recording.

11. The method of claim 10, wherein each of the first media item and the second media item include at least one selected from the group consisting of an image, a graphics interchange format (GIF) image, a text document, a survey, a webpage, a video, and a user profile.

12. The method of claim 10, further comprising:
uploading the interactive multimedia presentation to a server;
receiving an input, via the user interface, to share the interactive multimedia presentation;
generating a link to the interactive multimedia presentation in response to receiving the input;
receive user input indicative of a target end-user device and
providing the link to the target end-user device.

13. The method of claim 12, wherein the link is provided to the target end-user device via at least one selected from a group consisting of a text message, an email, and a social media post.

14. The method of claim 10, further comprising:
in response to the user uploading a first media item, prompting the user to type a caption corresponding to the first media item;
receiving a caption input by the user via the user interface; and
modifying the interactive multimedia presentation to simultaneously display the received caption and the first media item.

15. The method of claim 10, further comprising:
prompting the user to add a title card representative of the interactive multimedia presentation, wherein the title card includes at least one selected from a group consisting of a cover photo, a title, and a description;
receiving a title card input by the user via the user interface; and
modifying the interactive multimedia presentation to display the title card prior to displaying the first media item.

16. The method of claim 10, further comprising:
transcribing the first audio recording into a first text file and the second audio recording into a second text file; and
saving the first text file of the first audio recording as metadata corresponding to the first media item and the second text file of the second audio recording as metadata corresponding to the second media item.

17. The method of claim 10, further comprising:
in response to the user selecting an editor icon associated with the first visual thumbnail on the user interface, presenting commands to the user on the user interface, wherein the commands include at least one selected from a group consisting of: deleting the first media item, editing the transcription corresponding to the first audio recording, and modifying the first audio recording.

18. The method of claim 10, further comprising:
receiving, via the user interface, user input indicative of user interaction with the first media item, and
displaying the second media item while simultaneously playing back the second audio recording in response to receiving the user input indicative of user interaction with the first media item.

* * * * *